Patented Mar. 27, 1951

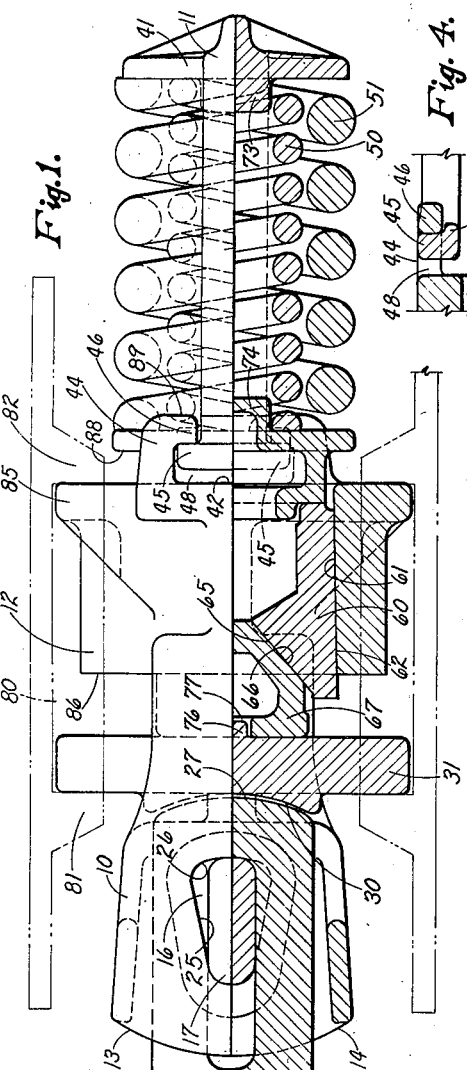

2,546,486

UNITED STATES PATENT OFFICE 2,546,486

DRAFT RIGGING

Donald Willison, Shaker Heights, Ohio, assignor to National Malleable and Steel Castings Company, Cleveland, Ohio, a corporation of Ohio Application November 29, 1946, Serial No. 712,749

12 Claims. (Cl. 213—34)

This invention relates to railway draft rigging and more particularly to a combination yoke and shock absorbing mechanism. The present invention provides various improvements over the construction disclosed in my prior copending application, Serial No. 705,556, filed October 25, 1946.

The conventional railway draft rigging generally comprises a draft gear or shock absorbing mechanism and a yoke, each of which is a distinct or independent member. The usual draft gear is a self-contained unit including springs and associated friction members while the yoke encircles the draft gear and transmits draft and buffing forces thereto from the car coupler.

My invention comprises a draft rigging in which the yoke, in addition to connecting its associated shock absorbing mechanism to the car coupler, forms a component part of the mechanism. By thus combining the two parts an appreciable saving in weight is effected. Also, by forming the yoke member in two parts which have an interlocking connection, assembly and disassembly of the mechanism is greatly facilitated.

Accordingly, an object of my invention is to provide a combination yoke and draft gear which is simple, effective and light in weight.

Another object is to provide a novel yoke for carrying an associated shock absorbing mechanism.

A further object is to provide a combination yoke and shock absorbing mechanism in which the housing member thereof is formed integral with the yoke.

A more specific object is to provide a two-part yoke which when assembled with its associated shock absorbing mechanism is maintained in operative relationship therewith without the need of additional parts.

Other objects and advantages of my invention will appear from the following description taken in conjunction with the drawing in which:

Fig. 1 is a plan view partly in longitudinal horizontal section of an embodiment of the invention.

Fig. 2 is an elevational view partly in longitudinal, vertical section of the mechanism shown in Fig. 1.

Fig. 3 is a transverse, vertical sectional view taken on line 3—3 of Fig. 2.

Fig. 4 is a fragmentary view of the connection between the two parts of the yoke.

Referring to the drawings the yoke comprises a forward or main member 10 and a rear member 11 which is interlocked with the main member. Part 10 of the yoke is formed with a housing or shell 12 which has a pair of spaced arms 13 and 14 extending forwardly therefrom and adapted for operative connection to a car coupler. Arms 13 and 14 are provided at their forward ends with aligned tapered openings 16 for receiving a pin or key 17 which connects the yoke with the coupler shank 18. Slot 20 in the coupler shank for receiving key 17 is of such length that when the mechanism has traveled its full extent in buff, a clearance will remain between surface 21 of the slot and front surface 22 of the key to avoid any buffing shock being applied to the key. To enable horizontal angling of the coupler the side surfaces 25 of openings 16 preferably diverge rearwardly and are joined by a curved rear surface 26, thus permitting pivotal movement of key 17 and shank 18 relative to the yoke. Also, end surface 27 of shank 18 is curved coaxially with surface 26 and is adapted to engage a correspondingly curved surface 30 on front follower 31. Pin 17 is retained in place by bolts 35 which extend through lugs 36 on the underside of the yoke.

The rear member 11 of the yoke is formed with a pair of arms 40 joined by a rear abutment 41. The two members of the yoke are joined by means of interlocking L-shaped lugs 44 on housing 12 and lugs 45 on arms 40. Lugs 44 extend rearwardly and have an inwardly extending portion 46 spaced a predetermined distance from the end surface 42 of housing 12. Lugs 45 extend outwardly from the end of arms 40 into overlapping relationship with portions 46 and have rearwardly extending portions 47 which lie adjacent the inner sides of portions 46. It will be evident that this interlocking of the lugs will securely hold the two parts of the yoke together. To permit disengagement of the two yoke parts when desired, the lugs are so arranged that when they are interlocked as shown in the drawing, a clearance 48 is provided between surface 42 and the end surface of arms 40. This clearance is preferably of slightly greater longitudinal extent than the overlap between lug portions 46 and 47.

Carried by the rear member of the yoke are the inner and outer springs 50 and 51 of the mechanism, engaging abutment 41 and having a follower 52 at their forward ends. Portion 53 of the follower in addition to forming an abutment for the forward ends of the springs also serves to preclude any possibility of arms 40 collapsing inwardly. An annular flange 54 extends forwardly from portion 53 and is provided with a seating portion 55 engaged by friction shoes 60.

Shoes 60 are adapted for slidable engagement with the inner surface of housing 12 and in the embodiment shown three shoes are illustrated. The inner surface of the housing is formed with three pairs of angularly disposed plane surfaces 61. Each friction shoe is provided with a pair of surfaces 62 in engagement with surfaces 61 and shaped to correspond therewith. Each shoe at its forward end is provided with a wedge face 65 for engagement with surfaces 66 of wedge 67 which is interposed between the shoes and follower 31. The action of wedge 67 in the operation of the mechanism is to urge the shoes outwardly with increasing force as relative longitudinal movement occurs between the shoes and housing 12 during compression of springs 50 and 51. Surfaces 61 preferably converge slightly in a rearward direction so as to increase the amount of friction generated by the mechanism and to effect quick release between surfaces 61 and 62 upon release of the draft or buffing force to permit the parts to return to normal position. Each shoe is recessed as at 70 for reception of flange 71 on follower 52 which serves to maintain the follower in assembled relationship with the shoes and housing 12. Also, projections 73 and 74 are provided on abutment 41 and follower 52, respectively, to position and tie springs 50 and 51 relative to the yoke.

Follower 31 in expanded position of the mechanism engages abutments 75 on yoke arms 13 and 14, which are so positioned as to place the springs under a predetermined amount of initial compression. Follower 31 is tied to the mechanism by means of projections 76 extending into opening 77 in wedge 67. It will be observed that all of the parts of the mechanism by reason of the various interlocking lugs and tie means are held together as a single unit, thereby permitting operation as well as shipment of the assembled mechanism without any of the parts being displaced or lost.

The draft pocket 80 (shown in dot-dash) has front and rear stops 81 and 82 respectively. Follower 31 extends into the pocket and normally engages front stops 81, while lateral flanges 85 on housing 12 also extend into the pocket and normally engage rear stops 82. When a buffing force is applied to the coupler, housing 12 remains in engagement with stops 82 as follower 31 is moved by the coupler shank 18 away from stops 81 and toward front surface 86 of the housing. This movement is resisted by the friction generated between shoes 60 and the housing and by the springs 50 and 51 until follower 31 engages surface 86 at the end of the travel of the mechanism. With follower 31 and the housing in engagement a clearance remains between surface 21 of slot 20 in the coupler shank and front surface 22 of key 17, thereby avoiding any buffing shock against the key. The various parts are so arranged that springs are never buffed solid, engagement between the follower and housing occurring while a substantial amount of free travel of the springs remains, so that the maximum force applied to arms 40 and lugs 44 and 45 of the yoke never exceeds the compression of the springs. Therefore, rear member 11 of the yoke may be considerably lighter in weight than the forward member 10 which must be able to withstand any uncushioned forces applied thereto.

In draft the coupler shank 18 through key 17 pulls the yoke forwardly against the resistance of springs 50 and 51 and the friction generated between shoes 60 and housing 12. During this operation wedge 67 and shoes 60 remain stationary as housing 12 moves forwardly toward follower 31. As in buff engagement occurs between follower 31 and surface 86 of the housing at the end of the travel in draft, and the springs are never compressed solid.

It will be understood that throughout the operation of the mechanism yoke members 10 and 11 are urged apart by the springs so that lugs 45 and 46 always remain interlocked, and there is no danger of a separation of the yoke member in service. The springs are under a predetermined amount of initial compression which interlocks the lugs and leaves the clearance 48 as previously mentioned. To disengage the yoke it is necessary to move arms 40 forwardly to take up clearance 48 until lug 47 is withdrawn from overlapping relationship with lug portion 46, after which the arms may be either raised or lowered to clear lugs 44 and 46 and the two yoke members separated. However, flange 53 of follower 52 will preclude disconnection of the yoke members unless, after arms 40 have been moved forwardly to take up clearance 48, the follower is moved rearwardly sufficiently for flange 53 to be clear of lugs 44. This also withdraws the forward end of the follower so that flange 71 thereof will be clear of housing 12.

Accordingly, to disassemble the mechanism it is desirable first to precompress the springs by means of pressure applied to follower 52 an amount which positions the follower so that the forward surface 88 of flange 53 is spaced rearwardly from end surface 89 of lug 44 a distance at least equal to clearance 48. Thereafter, member 11 can be moved forwardly to disengage the overlapping lug portions 46 and 47 and the two yoke members disconnected. Friction shoes 60, wedge 67 and follower 31 may then be readily removed from yoke member 10.

Assembly of the mechanism is accomplished by applying the preceding steps of disassembly in reverse order.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. A combination yoke and shock absorbing mechanism comprising a friction housing having arms extending forwardly therefrom and adapted for connection to a railway car coupler, said housing having an inner surface, friction means within said housing and being in longitudinal slidable engagement with said inner surface, a yoke member extending rearwardly from said housing, means on said housing and yoke member for detachably interlocking said housing and yoke member, and spring means within said yoke member for opposing movement of said friction means relative to said housing.

2. A two-part yoke for railway draft rigging comprising a forward member for operative connection to a car coupler, said forward member having an integral housing, said housing having a longitudinally extending inner friction surface for slidable engagement with friction means of an associated cushioning mechanism, and a rearward spring carrying portion detachably interlocked with said forward member.

3. A combination yoke and shock absorbing mechanism comprising a yoke for carrying said mechanism, said yoke having a forward portion including a housing, said housing having an inner surface, friction means within said housing in longitudinal slidable engagement with said inner surface, a rearward portion detachably interlocked with said housing, and spring means carried by said rearward portion for opposing movement of said friction means relative to said housing.

4. In a combination yoke and draft gear including spring means, friction means and wedge means, a member having a housing portion for receiving said friction means, said housing having an inner surface, said friction means slidably engaging said inner surface of said housing in a longitudinal direction, said wedge means being adapted to urge said friction means against said surface and longitudinally against the resistance of said spring means, and a yoke member detachably secured to said first-named member and carrying said spring means.

5. In a combination yoke and draft gear, a separable yoke comprising a spring carrying portion and an integral housing portion, said housing portion having an inner friction surface, friction means in said housing portion and being in longitudinal slidable engagement with the inner surface of said housing portion, spring means in said spring carrying portion for opposing movement of said friction means relative to said housing portion, and interengaging joining means on said portions.

6. In a combination yoke and friction shock absorbing mechanism, a spring carrying yoke member, spring means in said member, another yoke member positioned forwardly of said spring carrying member and having a friction housing, said housing having inner surfaces extending lengthwise of said mechanism, friction shoes slidably engaging said inner surfaces of said housing, a wedge member for urging said shoes rearwardly against the resistance of said springs into frictional engagement with said surfaces, and means for detachably securing said spring carrying member to said housing.

7. In a combination yoke and friction shock absorbing mechanism, a housing member having an inner surface, friction shoes within said member and being in slidable engagement with said surface in a longitudinal direction, a spring carrying U-shaped member extending rearwardly of said housing member, spring means carried by said U-shaped member and reacting between said shoes and the base of said U-shaped member, a wedge for urging said shoes against said surface and longitudinally against the resistance of said spring means, and lug means on said housing member for detachably securing said U-shaped member to said housing member.

8. In a railway draft rigging, a draft pocket comprising rear stop lugs, a combination yoke and friction shock absorbing mechanism comprising a yoke formed in two parts detachably joined together, one of said parts having an integral friction housing, said housing having lateral flanges for engagement with said stop lugs to limit rearward movement of said part in buff, the other of said parts extending rearwardly from said housing and having a pair of arms joined by a vertical rear abutment.

9. A two-part yoke for railway draft rigging comprising a forward part having an integral friction housing for an associated friction shock absorbing mechanism including spring means, and a rearward part adapted for carrying said spring means of the mechanism, said parts having interlocking L-shaped lugs for detachably securing said parts together.

10. In a combination yoke and friction shock absorbing mechanism a friction housing member, friction shoes slidably associated with the inner surface of said member lengthwise of said mechanism, spring means opposing relative movement between said shoes and housing member, and means for carrying said spring means comprising a U-shaped member detachably secured to said housing member, said U-shaped member having lugs extending into overlapping relationship with lugs on said housing member.

11. In a draft rigging, front and rear stop lugs, a front follower engaging said front stop lugs and being movable rearwardly in buff, a housing member engaging said rear stop lugs and forwardly extending means on said member for connection to a car coupler, said member being movable forwardly by the coupler toward said follower in draft, friction shoes slidably associated with said housing member for movement lengthwise thereof, spring means for opposing relative movement between said shoes and housing member, a yoke member for carrying said spring means, said yoke member being detachably secured to said housing member, and wedge means interposed between said follower and shoes and urging said shoes outwardly against said housing member and rearwardly against said spring means.

12. A yoke for railway draft rigging comprising a forward member for operative attachment to a car coupler, said yoke having a housing, and a spring carrying member for removable attachment to the rearward end of said housing, said housing having an inner surface extending in a longitudinal direction for slidable engagement with associated friction shoes, said housing having lugs extending rearwardly therefrom, said lugs having laterally extending portions spaced a predetermined distance from the end of said housing, said spring carrying member having lugs in overlapping engagement with said lateral portions to join said member to said housing, said spring carrying member being detachable from said housing by moving said spring carrying member forwardly sufficiently to bring said lugs out of said overlapping engagement with each other and then moving it transversely of said housing.

DONALD WILLISON.

REFERENCES CITED

The following references are of record in the file of this patent:

UNITED STATES PATENTS

| Number | Name | Date |
|---|---|---|
| 1,136,053 | Schwartzenberg | Apr. 20, 1915 |
| 1,765,875 | O'Connor | June 24, 1930 |
| 1,800,549 | Lounsbury | Apr. 14, 1931 |